Patented July 10, 1934

1,965,842

UNITED STATES PATENT OFFICE 1,965,842

PRODUCTION OF HYDROXYBENZENE-PHTHALEINS

Frederick H. Kranz, Buffalo, N. Y., assignor to National Aniline & Chemical Company, Inc., New York, N. Y., a corporation of New York No Drawing. Application November 21, 1931, Serial No. 576,619

19 Claims. (Cl. 260—62)

This invention relates to the production of hydroxybenzene phthaleins; that is, condensation products, such as phenol-phthalein, resorcin-phthalein (fluorescein), orcin-phthalein, etc., which can be produced by the condensation of an o-phthalic anhydride compound with a suitable hydroxybenzene compound having a free-position ortho or para to the hydroxyl group. It relates particularly to the production of hydroxybenzene-phthaleins in a purified condition, and especially to a method of obtaining in a purified condition fluorescein resulting from the condensation of o-phthalic anhydride with resorcinol.

The production of hydroxybenzene-phthaleins is well known to the art by heating an o-phthalic anhydride compound (o-phthalic anhydride or a nuclear derivative thereof) with a suitable hydroxybenzene compound (phenol or a nuclear derivative thereof having a free-position ortho or para to the hydroxyl group) in the presence or absence of a condensing agent. In carrying out the process in accordance with one method of procedure, suitable proportions of the phthalic anhydride compound and the hydroxybenzene compound are heated in a reaction vessel with or without the addition of a condensing agent until the condensation is complete.

As thus prepared, the products are contaminated by impurities, the exact nature of which is not known, but which probably are produced by side reactions during the condensation. The elimination of these impurities generally is troublesome and expensive; but it is freqeuntly necessary in order to render the product commercially useful (for example, as medicinal agents, as intermediates for the production of dyestuffs suitable for use as food colors, and the like).

For example, in the condensation of o-phthalic anhydride with resorcinol, the fluorescein produced is contaminated with undesirable impurities. It has been proposed to purify this product by extracting it with water to remove water-soluble impurities, then dissolving the remaining product in ethyl or methyl alcohol and allowing the fluorescein to crystallize. It has also been proposed to convert the fluorescein in the product to its acetyl derivative by boiling the crude product with acetic anhydride, adding excess of alcohol to the resulting mixture to precipitate the acetyl derivative, recrystallizing the resulting product from acetone, boiling it with alcoholic caustic potash to hydrolyze the acetyl derivative back to fluorescein, and recovering the fluorescein. These procedures entail considerable difficulty and expense; they result, furthermore, in a low yield of purified product, due to loss of material in the purification operations.

An object of the present invention is to provide a simple process for obtaining hydroxybenzene-phthaleins in a purified condition. Another object of the invention is to provide a process of purifying hydroxybenzene-phthaleins resulting from the condensation of o-phthalic anhydride compounds with hydroxybenzene compounds which process may be readily carried out and will produce a high yield of purified product. A further object of the invention is to provide improvements in the process of making hydroxybenzene-phthaleins by the condensation of o-phthalic anhydride compounds with hydroxybenzene compounds whereby the hydroxybenzene-phthaleins may be obtained in a purified condition. Additional objects of the invention are to provide a process of purifying fluorescein resulting from the condensation of o-phthalic anhydride with resorcinol whereby a high yield of purified product may be obtained, and to provide improvements in the process of making fluorescein by the condensation of o-phthalic anhydride with resorcinol whereby the fluorescein may be obtained in a purified condition.

Other objects of the invention will in part be obvious and will in part appear hereinafter.

It has been found, according to the present invention, whereas the hydroxybenzene-phthaleins are relatively insoluble in the organic compounds included within the group consisting of the aromatic hydrocarbons, the hydroaromatic hydrocarbons, the higher aliphatic hydrocarbons and the lower halogenated hydrocarbons, even at elevated temperatures, that the impurities present in crude hydroxybenzene-phthaleins, and especially in the reaction-mixtures resulting from the condensation of o-phthalic anhydride compounds with hydroxybenzene compounds containing a free-position ortho or para to the hydroxyl group, are relatively soluble in said compounds, particularly at elevated temperatures. It has furthermore been found, according to the present invention, that the solubility of the impurities in said compounds is increased if there is mixed with the said compound, a liquid which is itself a solvent for the hydroxybenzene-phthalein.

The invention accordingly comprises the steps and the relations of each to others thereof which will be exemplified in the process hereinafter disclosed. The scope of the invention will be indicated in the claims.

In the practice of the invention in accordance with one method of procedure, the impure hydroxybenzene-phthalein may be purified by extracting it with a solvent for the impurities comprising a compound included within the group consisting of the hydrocarbons and the halogenated hydrocarbons, and the hydroxybenzene-phthalein then may be separated from the resulting solution of the impurities, as for example, by filtration or in any other suitable manner. The purified hydroxybenzene-phthalein then may be treated to remove residual solvent, if desired, as for example, by washing with alcohol, acetone, etc., and/or by steam distillation, or in any other suitable manner. Also, if desired, the solvent or extracting agent may be separated from the impurities, as for example, by steam distillation, and again employed for a further repetition of the process.

Owing to the comparatively low solubility of the impurities in the extracting agent at ordinary temperatures, the extraction in accordance with this procedure is preferably carried out in practice at an elevated temperature, and preferably at about 150° C. or higher. As a consequence, the extracting agents employed in accordance therewith are preferably those which have a boiling point of about 150° C. or higher. Organic compounds whose boiling points are below the extraction temperature also may be employed, however, if desired, by carrying out the extraction under superatmospheric pressure. Compounds which are normally solids also may be used, provided their melting points are less than the extraction temperature. Among the organic compounds which may be employed as extracting agents, there may be mentioned, by way of example, the higher boiling hydrocarbons of the benzene series (as for example, cumene, the cymenes, the methyl-ethyl-benzenes, the diethylbenzenes, the mesitylenes, etc.), the hydrocarbons of the naphthalene series (as for example, naphthalene, alpha-methyl-naphthalene, beta-methyl-naphthalene, 1.4-dimethyl-naphthalene, ethyl-naphthalene, etc.) the hydroaromatic hydrocarbons and their derivatives (as for example tetrahydronaphthalene, etc.), the higher aliphatic hydrocarbons (as for example heptane, octane, nonane, decane, kerosene, etc.), and the halogenated derivatives of the hydrocarbons, preferably those which contain not more than four atoms of halogen in the molecule (as for example, tetrachloroethane, the dichlorobenzenes, the trichlorobenzenes, monobromobenzene, the dibromobenzenes, the monochlorotoluenes, the dichlorotoluenes, alpha-chloronaphthalene, etc.), and the like. Mixtures of two or more of the hydrocarbons and/or halogenated hydrocarbons also may be employed.

In the practice of the invention in accordance with another method of procedure, the impure hydroxybenzene-phthalein may be purified by extracting it with a composite liquid which is a solvent for impurities, and the hydroxybenzene-phthalein may be separated from the solution of the impurities in any suitable manner, as for example by filtration. The purified hydroxybenzene-phthalein then may be treated to remove residual solvent, if desired in any suitable manner, as for example in the manner above described.

The composite liquid employed as a solvent or extracting agent may consist of the organic compounds above described or other liquid organic compounds included in the class consisting of the hydrocarbons and the halogenated hydrocarbons, and preferably those which have a boiling point of about 80° C. or higher, in admixture with a compound which, by itself, is a solvent for the hydroxybenzene-phthalein. By the employment of a composite solvent for the impurities, in which the impurities are soluble to a greater extent than in the organic compound itself, a commercially practicable process is obtained which may be operated at normal or slightly elevated temperatures instead of at the more elevated temperatures required in the absence of the solvent for the hydroxybenzene-phthalein.

Among the organic compounds which may be employed as a component of the composite solvent or extracting agent, there may be mentioned, by way of example, the hydrocarbons of the benzene series (as for example, benzene, toluene, the xylenes, cumene, the cymenes, the methyl-ethyl-benzenes, the diethyl-benzenes, the mesitylenes, etc.), the hydrocarbons of the naphthalene series (as for example, naphthalene, alpha-methyl-naphthalene, beta-methyl-naphthalene, 1.4-dimethyl-naphthalene, alpha-naphthalene, etc.), the hydroaromatic hydrocarbons and their derivatives (as for example, tetrahydronaphthalene, etc.), the higher aliphatic hydrocarbons (as for example, heptane, octane, nonane, decane, kerosene, etc.), and the halogenated derivatives of the hydrocarbons, preferably, those which contain not more than 4 atoms of halogen in the molecule (as for example, ethylene dichloride, tetrachloroethane, monochlorobenzene, the dichlorobenzenes, the trichlorobenzenes, monobromobenzene, the dibromobenzenes, the monochlorotoluenes, the dichlorotoluenes, alpha-chloronaphthalene, etc.), and the like. Among the solvents for the hydroxybenzene-phthaleins which may be employed as the other component of the composite solvent to increase the solubility of the impurities, there may be mentioned, by way of example, the aliphatic alcohols (methyl alcohol, ethyl alcohol, the propyl alcohols and the higher alcohols), acetone, etc. Ethyl alcohol is preferably employed. Obviously the composite solvents preferably should be made up of components which are miscible to produce homogeneous solutions. Mixtures of two or more of the hydrocarbons and/or halogenated hydrocarbons and mixtures of two or more solvents for the hydroxybenzene-phthaleins also may be employed.

The amount of alcohol, acetone or equivalent employed relative to that of the hydrocarbon or halogenated hydrocarbon may be varied within wide limits. Preferably the alcohol or equivalent should form a minor part of the composite solvent. A composite solvent containing about 10 to 25 per cent. of alcohol is particularly desirable for commercial operation. In general, the greater the proportion of alcohol in the composite solvent, the more complete is the purification; but the loss of hydroxybenzene-phthalein is also greater under such circumstances, as the alcohol tends also to increase the solubility of the hydroxybenzene-phthalein in the solvent. On the other hand the greater the proportion of hydrocarbon or halogenated hydrocarbon present in the composite solvent, the greater is the amount of composite solvent necessary to effect a given purification; inasmuch as a decrease in the relative proportion of alcohol or equivalent to hydrocarbon or halogenated hydrocarbon tends to lessen the solubility of the impurities in the composite solvent.

The extraction or dissolution of the impurities is preferably carried out at an elevated temperature, preferably at a temperature above 70° C., and particularly at the boiling point of the composite solvent; and the solution of impurities is preferably separated from the hydroxybenzene-phthalein also at an elevated temperature, preferably at temperatures above 70° C., inasmuch as the impurities are relatively more soluble at elevated temperatures than at ordinary temperatures. By employing elevated temperatures for the extraction and separation of impurities it is possible to employ a lesser amount of alcohol or equivalent than at ordinary temperatures, thereby decreasing the loss of hydroxybenzene-phthalein. If the composite solvent has a melting point above the temperature which ordinarily would be employed, the dissolution of the impurities and separation of the solution from the hydroxybenzene-phthalein are preferably carried out at temperatures above the melting point of the composite solvent.

The invention also may be carried out, in accordance with another method of procedure, in conjunction with the preparation of hydroxybenzene-phthaleins by the condensation of an o-phthalic anhydride compound with a suitable hydroxybenzene compound in the presence of an organic liquid as a solvent or diluent for the reaction-mixture, as is more fully described and claimed in the copending application of P. B. Wood, J. Ogilvie and myself, Serial No. 576,610, filed of even date herewith. Thus the o-phthalic anhydride compound and the hydroxybenzene compound may be condensed in a reaction-mixture containing a hydrocarbon or a halogen derivative of a hydrocarbon (as for example, one of those mentioned above, and preferably one which is inert to the reacting ingredients, is relatively immiscible with water, is a solvent for the reacting ingredients but not for the product, and has a boiling point in excess of 130° C. and preferably between 160° and 190° C.), and upon completion of the reaction the hydroxybenzene-phthalein produced may be recovered from the reaction mixture in a purified condition. For example, the reaction mixture may be filtered, or otherwise treated, at a suitably elevated temperature to separate the insoluble hydroxybenzene-phthalein from the solution of impurities; or the necessary amount of an alcohol or equivalent solvent may be added to the reaction-mixture to produce with the hydrocarbon or halogenated hydrocarbon a composite solvent of the desired composition, and the hydroxybenzene-phthalein then may be separated from the resulting solution of the impurities; as for example, by filtration or in any other suitable manner. In carrying out the process in accordance with this latter method of procedure, the alcohol or equivalent solvent may be added to the hot reaction-mixture or the reaction-mixture may be permitted to cool, the alcohol or equivalent solvent then may be added, and the resulting mixture may be heated to a temperature sufficient to produce the desired extraction.

The invention may be employed for the purification of any of the impure hydroxybenzene-phthaleins; for example those obtainable by condensing a suitable o-phthalic anhydride compound (as for example, o-phthalic anhydride, dichlorophthalic anhydride, tetrachlorophthalic anhydride, etc.) with a suitable hydroxybenzene compound having a free-position ortho or para to the hydroxyl group (as for example, phenol, resorcinol, pyrogallol, orcin, etc.). It is preferably employed, however, for the purification of dihydroxyfluoranes resulting from the condensation of o-phthalic anhydride compounds with dihydroxybenzene compounds having a free-position ortho to one of the hydroxyl groups (as for example, resorcinol, its homologues and derivatives); and it is especially of interest for the purification of fluorescein resulting from the condensation of o-phthalic anhydride with resorcinol.

The invention will be illustrated by the following specific examples, but it is to be understood that it is not limited to the details thereof and that changes may be made without departing from the scope of the invention. The parts are by weight.

*Example 1.*—Crude or impure fluorescein (150 parts), resulting from the condensation of o-phthalic anhydride with resorcinol, is heated to boiling with Solvent 74 (commercial dichlorobenzene—250 parts—boiling at 174° C.) in a suitable vessel connected with a reflux condenser. Vapors given off by the boiling mixture are condensed by the reflux condenser and returned to the vessel. The refluxing treatment is carried out until the desired extraction of impurities is attained (about 1 to 2 hours), the hot mixture is then filtered at approximately the boiling temperature of the mixture, and the filter cake is washed with hot Solvent 74.

*Example 2.*—Crude or impure phenolphthalein (50 parts), resulting from the condensation of o-phthalic anhydride with phenol in the presence of zinc chloride as a condensing agent, is refluxed for about 2 hours with a composite solvent (240 parts), consisting of toluene and ethyl alcohol in the proportion of about 5 parts of the former to 1 of the latter. The mixture is then allowed to cool to about 50° C., and is then filtered without substantial cooling. The filter-cake of purified phenolphthalein is washed with a toluene-alcohol mixture of the above composition.

*Example 3.*—Crude or impure fluorescein (200 parts), resulting from the condensation of o-phthalic anhydride with resorcinol, and a composite solvent (300 parts) consisting of benzene and ethyl alcohol (2B denatured), in the proportions of about 5 parts of the former to 1 part of the latter, are heated to boiling in a suitable vessel connected with a reflux condenser. Vapors given off by the boiling mixture are condensed by the reflux condenser and returned to the vessel. Refluxing is carried out until the desired extraction of impurities is secured (about 1 hour), the mixture is then cooled to about 70° C., and the solution is separated by filtration from the purified fluorescein. The filter cake is washed with a composite solvent (about 100 parts) of the same composition, and the washed filter cake is steam distilled to remove residual solvent, washed with water and dried.

If, in the above example, a composite solvent is employed consisting of 5 parts of benzene to 2 parts of the ethyl alcohol, the extraction mixture may be cooled to room temperature, i. e., about 15° to 20° C., and the solution of impurities may be separated from the purified fluorescein at that temperature.

*Example 4.*—In an enameled kettle equipped with an agitator and a reflux condenser, resorcinol (1060 parts) is heated with "Solvent 74" (commercial dichlorobenzene—482 parts), to form a solution. Phthalic anhydride (868 parts) is added, and the temperature of the batch is raised to the boiling point of the mixture (185° to 190° C.), where it is held for about two hours.

The vapors evolved from the reaction-mass are cooled to condense "Solvent 74", which is returned to the reaction-mixture, while uncondensed water vapor is permitted to pass out through the condenser. Additional "Solvent 74" (482 parts), preheated to about 100° C. (so as not to cool the reaction mass too low), is then introduced, and refluxing of the batch is continued for about two hours longer. Then another similar portion of preheated "Solvent 74" is added, and refluxing of the reaction-mixture at a temperature of 185° to 190° C. is continued for a total period of about 16 hours to complete the condensation. When the condensation process is complete, ethyl alcohol (193 parts of 2B denatured) is added to the refluxng mixture over a period of about 4 hours, the boiling point of the batch falling to 85° to 90° C. The resulting mixture is then filtered without substantial cooling and is washed at about the same temperature (about 85° C.) with a mixture of "Solvent 74" (558 parts) and ethyl alcohol (145 parts of 2B denatured). The filter cake is transferred to a still, is steam distilled to remove the solvent, then filtered, washed with hot water until the wash water is no longer acid to congo red paper, and then dried. The resulting fluorescein is of a high degree of purity, suitable for the production of erythrosine for use as a food color.

Since, in carrying out the above process, changes may be made in the ingredients and conditions employed without departing from the scope of the invention, it is intended that all matter contained in the above description shall be interpreted as illustrative and not in a limiting sense, except as limited by the claims.

I claim:

1. The process of purifying an impure hydroxybenzene-phthalein, which comprises separating impurities from the hydroxybenzene-phthalein by means of an inert solvent for the impurities comprising an organic compound included in the group consisting of the aromatic hydrocarbons, the hydroaromatic hydrocarbons, the higher aliphatic hydrocarbons and the halogenated hydrocarbons.

2. The process of purifying an impure hydroxybenzene-phthalein, resulting from the condensation of a hydroxybenzene compound with an o-phthalic anhydride compound, which comprises forming a solution of impurities in an inert solvent therefor comprising an organic compound included in the group consisting of aromatic hydrocarbons, the hydroaromatic hydrocarbons, the higher aliphatic hydrocarbons and the lower halogenated hydrocarbons, and separating the hydroxybenzene-phthalein from the solution.

3. The process of purifying an impure hydroxybenzene-phthalein, which comprises treating it with a solvent for the impurities comprising an organic compound having a boiling point not less than 150° C. and included within the group consisting of the aromatic hydrocarbons, the hydroaromatic hydrocarbons, the higher aliphatic hydrocarbons and the halogenated hydrocarbons containing not more than 4 halogen atoms in the molecule.

4. The process of purifying an impure hydroxybenzene-phthalein, resulting from the condensation of a hydroxybenzene compound with an o-phthalic anhydride compound, which comprises treating it at a temperature above 150° C. with a solvent for the impurities comprising an inert organic liquid having a boiling point not less than 150° C. and included within the group consisting of hydrocarbons and the halogenated hydrocarbons containing not more than 4 halogen atoms in the molecule, and separating the hydroxybenzene-phthalein from the resulting solution of impurities at a temperature not less than 150° C.

5. The process of purifying impure fluorescein, resulting from the condensation of resorcinol with o-phthalic anhydride, which comprises heating it with dichlorobenzene at a temperature between 150° C. and the boiling point of the mixture, and separating the fluorescein from the resulting solution of impurities at a temperature above 150° C.

6. The process of purifying an impure hydroxybenzene-phthalein which comprises separating impurities from the hydroxybenzene-phthalein by means of an inert solvent for the impurities comprising a solvent for the hydroxybenzene-phthalein and an organic compound included in the group consisting of the hydrocarbons and the halogenated hydrocarbons.

7. The process of purifying an impure hydroxybenzene-phthalein, resulting from the condensation of a hydroxybenzene compound with an o-phthalic anhydride compound which comprises forming a solution of impurities in an inert composite solvent for the impurities comprising a minor proportion of an organic liquid which is a solvent for the hydroxybenzene-phthalein and a major proportion of an organic compound included in the group consisting of the aromatic hydrocarbons, the hydroaromatic hydrocarbons, the higher aliphatic hydrocarbons and the lower halogenated hydrocarbons, and separating the hydroxybenzene-phthalein from the solution.

8. The process of purifying an impure hydroxybenzene-phthalein, resulting from the condensation of a hydroxybenzene compound with an o-phthalic anhydride compound, which comprises extracting it with a composite solvent consisting of a monohydric aliphatic alcohol and an organic liquid having a boiling point not less than 80° C. and included within the group consisting of the aromatic hydrocarbons, the hydroaromatic hydrocarbons, the higher aliphatic hydrocarbons and the halogenated hydrocarbons containing not more than 4 halogen atoms in the molecule.

9. The process of purifying an impure hydroxybenzene-phthalein, resulting from the condensation of a hydroxybenzene compound with an o-phthalic anhydride compound, which comprises treating it at a temperature not less than 70° C. with a composite solvent consisting of a minor proportion of a monohydric aliphatic alcohol and a major proportion of an organic compound having a boiling point not less than 80° C. and included within the group consisting of the aromatic hydrocarbons, the hydroaromatic hydrocarbons, the higher aliphatic hydrocarbons and the halogenated hydrocarbons containing not more than 4 halogen atoms in the molecule, and separating the hydroxybenzene-phthalein from the resulting solution of impurities.

10. The process of purifying an impure polyhydroxyfluorane, resulting from the condensation of a polyhydroxybenzene compound with an o-phthalic anhydride compound, which comprises treating it with a composite solvent for the impurities consisting of ethyl alcohol and an organic liquid having a boiling point not less than 80° C. and included within the group consisting of the aromatic hydrocarbons and the halogenated hydrocarbons containing not more than 4 halogen atoms in the molecule, and separating the resulting solution of impurities from the polyhydroxyfluorane at a temperature not less than 70° C.

11. The process of purifying an impure polyhydroxyfluorane, resulting from the condensation of a polyhydroxybenzene compound with an o-phthalic anhydride compound which comprises treating it at a temperature not less than 70° C. with a composite solvent for the impurities consisting of ethyl alcohol and an organic compound having a boiling point not less than 80° C. and included within the group consisting of the aromatic hydrocarbons, the hydroaromatic hydrocarbons, the higher aliphatic hydrocarbons and the halogenated hydrocarbons containing not more than 4 halogen atoms in the molecule 12. The process of purifying an impure polyhydroxyfluorane, resulting from the condensation of a polyhydroxybenzene compound with o-phthalic anhydride which comprises treating it at a temperature not less than 70° C. with a composite solvent for the impurities consisting of ethyl alcohol and a hydrocarbon of the benzene series in the proportion of about 1 part by weight of alcohol to 5 parts by weight of the hydrocarbon, and separating the resulting solution of the impurities from the polyhydroxyfluorane at a temperature not less than 70° C.

13. The process of purifying impure fluorescein, resulting from the condensation of resorcinol with o-phthalic anhydride, which comprises heating it with a composite solvent consisting of ethyl alcohol and benzene in the proportion by weight of 1 of the former to about 5 of the latter at a temperature between 70° C. and the boiling point of the mixture, and separating the resulting solution of impurities from the fluorescein at a temperature not less than 70° C.

14. The process of producing a polyhydroxyfluorane which comprises condensing a polyhydroxybenzene compound containing a free position ortho to a hydroxyl group with an o-phthalic anhydride compound in a reaction mixture comprising an inert organic compound having a boiling point not less than about 130° C. and included in the group consisting of the hydrocarbons and their halogen derivatives, whereby a polyhydroxyfluorane is produced, adding to the resulting reaction-mixture an organic liquid which is miscible with said organic compound and which is a solvent for the polyhydroxyfluorane, and separating the polyhydroxyfluorane from the resulting solution of impurities.

15. The process of producing a polyhydroxyfluorane which comprises condensing a polyhydroxybenzene compound containing a free position ortho to a hydroxyl group with an o-phthalic anhydride compound in an inert organic liquid having a boiling point not less than about 130° C. and included in the group consisting of the hydrocarbons and the halogenated hydrocarbons containing not more than 4 halogen atoms in the molecule, whereby a polyhydroxyfluorane is produced, adding a monohydric aliphatic alcohol to the resulting reaction-mixture, and separating the polyhydroxyfluorane from the resulting solution of the impurities.

16. The process of producing a polyhydroxyfluorane which comprises condensing a polyhydroxybenzene compound containing a free position ortho to a hydroxyl group with an o-phthalic anhydride compound in a reaction-mixture comprising an organic compound having a boiling point between about 130° C. and 195° C. and included in the group consisting of the aromatic hydrocarbons, the hydroaromatic hydrocarbons, the higher aliphatic hydrocarbons and their halogen derivatives, whereby a polyhydroxyfluorane is produced, adding a monohydric aliphatic alcohol to the resulting reaction-mixture in an amount less than that of the organic liquid present, and separating the polyhydroxyfluorane from the resulting solution of impurities at a temperature not less than 85° C.

17. The process of producing fluorescein which comprises condensing resorcinol with o-phthalic anhydride in dichlorobenzene whereby fluorescein is produced, adding ethyl alcohol to the resulting reaction-mixture, boiling the resulting mixture to dissolve impurities in the composite solvent thereby produced, and separating the fluorescein from the resulting solution of impurities at a temperature of about 85° to 90° C.

18. The process of producing fluorescein which comprises condensing resorcinol with o-phthalic anhydride in dichlorobenezene whereby fluorescein is produced, adding to the resulting reaction mixture an amount of ethyl alcohol less than that of the dichlorobenzene present, boiling the resulting mixture to dissolve impurities in the composite solvent thereby produced, and separating the resulting solution of the impurities from the fluorescein at a temperature of about 85° to 90° C.

19. The process of producing fluorescein which comprises heating a mixture of 868 parts of o-phthalic anhydride, 1060 parts of resorcinol and 482 parts of dichlorobenzene at 185° C. to 190° C., adding two portions each of 482 parts of dichlorobenzene to the reaction mixture at intervals of about 2 hours, continuing the heating until the condensation has been completed, adding about 193 parts of ethyl alcohol to the resulting mixture while refluxing it at the boiling point, and filtering off the fluorescein from the resulting solution of impurities at a temperature of about 85° to 90° C.

FREDERICK H. KRANZ.